(12) United States Patent
Qi et al.

(10) Patent No.: US 8,412,287 B2
(45) Date of Patent: Apr. 2, 2013

(54) POWER SAVING SUPPORT FOR WIRELESS NETWORKS

(75) Inventors: Xin Qi, Beijing (CN); Shashikant Maheshwari, Irving, TX (US)

(73) Assignee: Nokia Siemens Networks Oy, Espoo (FI)

( * ) Notice: Subject to any disclaimer, the term of this patent is extended or adjusted under 35 U.S.C. 154(b) by 952 days.

(21) Appl. No.: 12/192,534

(22) Filed: Aug. 15, 2008

(65) Prior Publication Data

US 2010/0041445 A1    Feb. 18, 2010

(51) Int. Cl.
*H04B 1/38* (2006.01)

(52) U.S. Cl. .................. 455/574; 455/67.11; 455/343.1; 370/329; 375/354

(58) Field of Classification Search .................. 455/574, 455/67.11, 343.4; 370/329; 375/354
See application file for complete search history.

(56) References Cited

U.S. PATENT DOCUMENTS

| | | | |
|---|---|---|---|
| 6,456,306 B1 | 9/2002 | Chin et al. | |
| 6,577,862 B1 | 6/2003 | Davidson et al. | |
| 7,617,073 B2 | 11/2009 | Trinon et al. | |
| 8,040,854 B2 * | 10/2011 | Furueda et al. | 370/334 |
| 2005/0232135 A1 | 10/2005 | Mukai et al. | |
| 2007/0242786 A1 * | 10/2007 | Kim et al. | 375/354 |
| 2008/0101286 A1 * | 5/2008 | Wang et al. | 370/329 |
| 2008/0107056 A1 * | 5/2008 | Choi et al. | 370/311 |
| 2008/0125048 A1 | 5/2008 | Pi | |
| 2008/0139212 A1 * | 6/2008 | Chen et al. | 455/450 |
| 2009/0052381 A1 * | 2/2009 | Gorokhov et al. | 370/329 |
| 2009/0304098 A1 | 12/2009 | Chun et al. | |
| 2010/0061327 A1 | 3/2010 | Qi et al. | |
| 2011/0194538 A1 | 8/2011 | Zheng et al. | |
| 2012/0106416 A1 | 5/2012 | Zheng et al. | |

FOREIGN PATENT DOCUMENTS

| | | |
|---|---|---|
| EP | 1613107 A2 | 1/2006 |
| EP | 1919160 A1 | 5/2008 |
| WO | 2006/040769 A1 | 4/2006 |
| WO | 2007/127945 A2 | 11/2007 |
| WO | 2010/028106 A2 | 3/2010 |
| WO | 2010/028106 A3 | 5/2010 |

OTHER PUBLICATIONS

"3rd Generation Partnership Project; Technical Specification Group Radio Access Network; Evolved Universal Terrestrial Radio Access (E-UTRA), Medium Access Control (MAC) protocol specification (Release 8)", 3GPP TS 36.321 V8.2.0, May 2008, 33 pages.

(Continued)

*Primary Examiner* — April G Gonzales
(74) *Attorney, Agent, or Firm* — Brake Hughes Bellermann LLP

(57) ABSTRACT

Various example embodiments are disclosed. According to an example embodiment, a technique may include transmitting a scheduling information to a mobile station in a wireless network during a listening window, determining whether an acknowledgement has been received within the listening window from the mobile station that acknowledges receipt of the scheduling information, resetting a size of a next sleep window for the mobile station to an initial sleep window size if the acknowledgement has been received from the mobile station, and increasing a size of the next sleep window for the mobile station if the acknowledgement has not been received from the mobile station within the listening window. In another example embodiment, techniques are disclosed for determining a starting location of a next listening window for a mobile station in a wireless network.

10 Claims, 12 Drawing Sheets

OTHER PUBLICATIONS

Bourlas, et al., "Persistent Allocation", IEEE 802.16 Broadband Wireless Access Working Group, IEEE C802.16maint-08/095r4, Mar. 17, 2008, pp. 1-44.

Cudak, Mark, "IEEE 802.16m System Requirements", Motorola, IEEE 802.16 Broadband Wireless Access Working Group, Oct. 19, 2007, pp. 1-26.

Fong, et al., "Persistent Assignment for VoIP Support", IEEE 802.16 Broadband Wireless Access Working Group, Nov. 4, 2007, pp. 1-4.

Gupta, et al., "Proposal for IEEE 802.16m Sleep Mode Operation", IEEE 802.16 Broadband Wireless Access Working Group, IEEE C802.16m-08/703r3, Jul. 16, 2008, pp. 1-18.

Hamiti, Shkumbin, "The Draft IEEE 802.16m System Description Document", Nokia, IEEE 802.16 Broadband Wireless Access Working Group, IEEE 802.16m-08/003R4, Jul. 29, 2008, 89 pages.

IEEE, "Part 16: Air Interface for Broadband Wireless Access Systems", IEEE WirelessMAN 802.16, DRAFT Standard for Local and metropolitan area networks, LAN/MAN Standards Committee of the IEEE Computer Society, IEEE Microwave Theory and Techniques Society, Revision of IEEE Std 802.16-2004, P802.16Rev2/D5, Jun. 2008, 2040 pages.

IEEE, "Part 16: Air Interface for Fixed and Mobile Broadband Wireless Access Systems", Amendment 2: Physical and Medium Access Control Layers for Combined Fixed and Mobile Operation in Licensed Bands and Corrigendum 1, IEEE Computer Society and the IEEE Microwave Theory and Techniques Society, IEEE Std. 802.16e 2005, Feb. 28, 2006, 864 pages.

So, "Performance Analysis of Uplink Scheduling Algorithms for VoIP Services in the IEEEE 802.16e OFDMA System", Wireless Personal Communications, vol. 47, No. 2, XP019617261, ISSN: 1572-834X Paragraphs 2.4, 3.1, Feb. 9, 2008, pp. 247-263.

Jin, et al., "Power Saving Strategies in IEEE 802.16m", IEEE 802.16 Broadband Wireless Access Working Group, IEEE C802.16m-08/756r2, Jul. 7, 2008, pp. 1-6.

Kang, et al., "IEEE 802.16 Presentation Submission Template (Rev. 9)", NSN & Nokia, Proposal for IEEE 802.16m Uplink Physical Resource Allocation Unit in Green-field, IEEE C802.16m-08/xxx, May 5, 2008, 13 pages.

Kone, et al., "Sleep Mode Considerations for a Device-Based Power Saving", ITRI, IEEE 802.16 Broadband Wireless Access Working Group, Jul. 7, 2008, pp. 1-12.

McBeath, et al., "New enhancements in WiMAX", Leading Edge, Issue 41, Jun. 2008, pp. 46-48.

International Search Report and Written Opinion for International Application No. PCT/US2009/055818, mailed on Apr. 13, 2010, 20 pages.

Qi, et al., "Considerations on 802.16m Sleep mode", IEEE 802.16 Broadband Wireless Access Working Group, IEEE C802.16m-08/719, Jul. 7, 2008, pp. 1-5.

Ren, et al., "Adaptive DRX Scheme for Optimal Power Saving", IEEE 802.16 Broadband Wireless Access Working Group, IEEE C802.16m-08/036, Jan. 16, 2008, pp. 1-6.

Son, et al., "Sleep mode operation for IEEE802.16m", C802.16m-08/721r1, Jul. 7, 2008, pp. 1-10.

U.S. Appl. No. 13/061,351, filed Feb. 28, 2011, 52 pages.

International Preliminary Report on Patentability and Written Opinion for International Application No. PCT/US2009/055818, mailed on Mar. 17, 2011, 12 pages.

Notice of Allowance for U.S. Appl. No. 12/553,644, mailed on Nov. 25, 2011, 15 pages.

"Part 11: Wireless LAN Medium Access Control (MAC) and Physical Layer (PHY) Specifications", IEEE Standard for Information Technology—Telecommunications and information exchange between systems—Local and metropolitan area networks—Specific requirements, IEEE Std. 802.11-2007, Jun. 12, 2007, 1231 pages.

Jung, Woo, et al., "Adaptive sleep mode algorithm in IEEE 802.16e", Proceedings of Asia-Pacific Conference on Communications 2007, Oct. 1, 2007, pp. 483-486.

* cited by examiner

POWER SAVING SUPPORT FOR WIRELESS NETWORKS

TECHNICAL FIELD

This description relates to wireless networks.

BACKGROUND

In some wireless networks, mobile stations (or subscriber stations) may occasionally switch to a low power or sleep mode. For example, a mobile station (MS) may negotiate with a base station (BS) to temporarily disrupt one or more wireless connections between the MS and the BS for a period of time known as a sleep window (which may last one or more frames, for example). During the sleep window, the BS does not schedule any downlink (DL) transmissions to the MS and the MS does not send any uplink (UL) transmissions to the BS, so that the MS may power down one or more hardware components required for communication in order to conserve power during the sleep window. For example, during a sleep window for a MS, the BS may buffer or drop arriving unicast packets associated with the MS (or associated with the MS's connection ID or user ID or MS ID), and may buffer any multicast packets for multicast transmission associated with a multicast ID for which the sleeping MS is a member. Each sleep window may typically be followed by a listening window in which the MS returns power to its required hardware components for communication and restores its one or more connections with the BS. During the listening window, any data buffered by the BS for the MS may then be transmitted to the MS and the MS may transmit UL to the BS. The MS may alternate between sleep and listening windows.

SUMMARY

According to an example embodiment, a method may include transmitting a scheduling information to a mobile station in a wireless network during a listening window, determining whether an acknowledgement has been received within the listening window from the mobile station that acknowledges receipt of the scheduling information, resetting a size of a next sleep window for the mobile station to an initial sleep window size if the acknowledgement has been received from the mobile station, and increasing a size of the next sleep window for the mobile station if the acknowledgement has not been received from the mobile station within the listening window.

According to another example embodiment, an apparatus may include a wireless transceiver; and a controller coupled to the transceiver. The wireless transceiver may be configured to transmit a scheduling information to a mobile station in a wireless network during a listening window. The controller may be configured to determine whether an acknowledgement has been received within the listening window from the mobile station that acknowledges receipt of the scheduling information, reset a size of a next sleep window for the mobile station to an initial sleep window size if the acknowledgement has been received from the mobile station, and increase a size of the next sleep window for the mobile station if the acknowledgement has not been received from the mobile station within the listening window.

According to another example embodiment, a method may include transmitting a scheduling information to a mobile station in a wireless network during a listening window, determining that an acknowledgement has been received within the listening window from the mobile station that acknowledges receipt of the scheduling information, and, resetting a size of a next sleep window for the mobile station to an initial sleep window size based on the receipt of the acknowledgement.

According to another example embodiment, an apparatus may include a wireless transceiver and a controller coupled to the transceiver. The wireless transceiver may be configured to transmit a scheduling information to a mobile station in a wireless network during a listening window. The controller may be configured to: determine that an acknowledgement has been received within the listening window from the mobile station that acknowledges receipt of the scheduling information, and reset a size of a next sleep window for the mobile station to an initial sleep window size based on the receipt of the acknowledgement.

According to another example embodiment may include receiving, at a mobile station from a base station in a wireless network during a listening window, a scheduling information that assigns or allocates resources to the mobile station for either uplink or downlink transmission, transmitting, within the listening window, an acknowledgement from the mobile station that acknowledges receipt of the scheduling information, and resetting a size of a next sleep window for the mobile station to an initial sleep window size based on the receipt of the scheduling information for the mobile station.

According to another example embodiment a method may include determining a starting location of a next listening window for a mobile station in a wireless network, communicating traffic between the mobile station and a base station during a current listening window, determining, based on the communicating, an extension (m) of the current listening window, determining a length of a next sleep window based on the extension (m) of the current listening window and an initial sleep window size (t), and, determining a starting location of the next listening window based on the starting point (n) of the current listening window, a length (v) of an unextended listening window, the extension (m) of the current listening window and the initial sleep window size (t).

According to another example embodiment, a method of determining a starting location of a next listening window for a mobile station in a wireless network may include receiving, from a base station, traffic at the mobile station during a current listening window, determining, based on the receiving, an extension (m) of the current listening window, and determining a starting location of the next listening window based on the starting point (n) of the current listening window, a length (v) of an unextended listening window, the extension (m) of the current listening window and the initial sleep window size (t).

According to an example embodiment, an apparatus may include a wireless transceiver and a controller coupled to the transceiver. The wireless transceiver may be configured to receive, from a base station, traffic at the mobile station during a current listening window. The controller may be configured to determine an extension (m) of the current listening window; and determine a starting location of the next listening window based on the starting point (n) of the current listening window, a length (v) of an unextended listening window, the extension (m) of the current listening window and the initial sleep window size (t).

The details of one or more implementations are set forth in the accompanying drawings and the description below. Other features will be apparent from the description and drawings, and from the claims.

DETAILED DESCRIPTION

Figure 1:
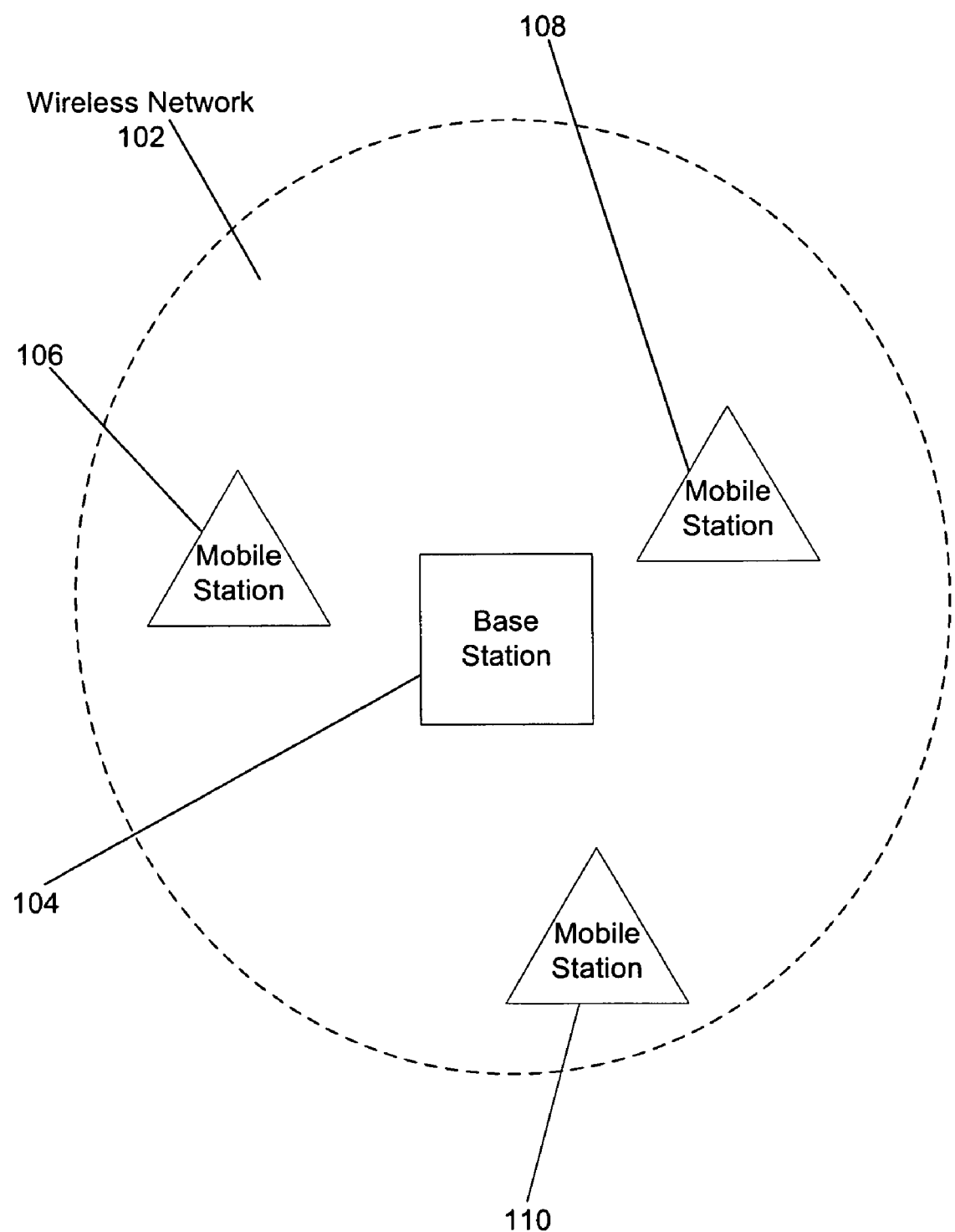
FIG. 1 is a block diagram of a wireless network according to an example embodiment.

FIG. 1 is a block diagram of a wireless network 102 including a base station 104 and three mobile stations 106, 108, 110 according to an example embodiment. While only three mobile stations are shown, any number may be provided. Although not shown, mobile stations 106, 108 and 110 may be coupled to base station 104 via relay stations or relay nodes, for example. The wireless network 102 may include, for example, an IEEE 802.16 Worldwide interoperability for Microwave Access (WiMAX) network, an IEEE 802.11 Wireless Local Area Network (WLAN) network, a cellular telephone network, or other wireless network, according to example embodiments. The base station 104 may include a cellular or WiMAX base station (BS), a node B, an 802.11 access point, or other infrastructure node, according to various example embodiments. The term "base station" (BS) may be used herein and may include any type of infrastructure node. The mobile stations 106, 108, 110 may include laptop or notebook computers, smartphones, personal digital assistants (PDAs), cellular telephones, WiMAX device, subscriber station, or any other wireless device, according to example embodiments. The term "wireless node" (or "wireless station") may include any type of wireless node, such as base stations, mobile stations, relay stations, etc. While the present disclosure may use some of the terminology of WiMAX or other wireless standards or specifications, the present disclosure may be applicable to any networking or wireless technologies. Base station (BS) 104 may transmit information (e.g., either broadcast, multicast or unicast) in a downlink (DL) direction to each mobile station (MS) 106, 108, 110, and each MS 106, 108, 110 may transmit information to the BS 104 in an uplink (UL) direction.

Figure 2:
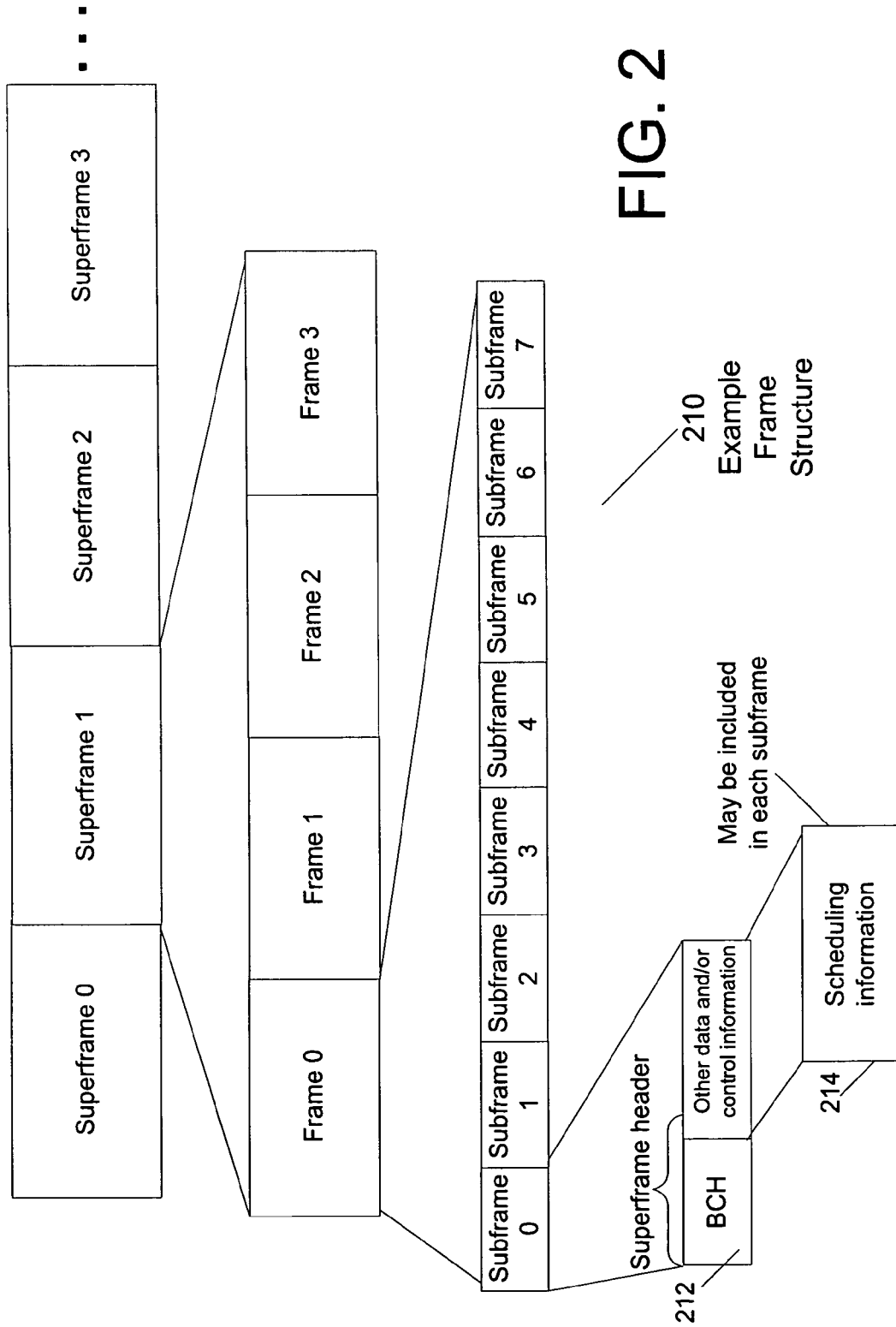
FIG. 2 is a diagram illustrating a frame structure 210 according to an example embodiment.

FIG. 2 is a diagram illustrating a frame structure 210 according to an example embodiment. As shown in FIG. 2, several superframes are shown, including superframe 0, superframe 1, superframe 2, superframe 3, . . . . Each superframe may include a number of frames, such as, for example, four frames per superframe. Each frame may include a number of subframes, such as, for example, eight subframes per frame. For example, as shown, frame 1 may include eight subframes, such as subframes 0-7. Thus, according to an example embodiment, a superframe may include 32 subframes, although any number of subframes may be used. Each subframe may include transmission resources, such as, for example, a number of Orthogonal Frequency Division Multiplexing (OFDM) symbols, e.g., across one or more subcarriers. For example, each subframe may include 5-7 OFDM symbols, depending on a type of the subframe. These are merely examples, and a subframe may include any number of resources or OFDM symbols.

Each subframe may be allocated by BS 104 for either DL transmission or UL transmission. The DL/UL ratio for subframes within a frame may vary, based on control information indicated or transmitted by the BS 104. For example, the DL/UL ratio may be 4/4 (meaning, the frame includes 4 DL subframes followed by 4 UL subframes), may be 5/3, or 3/5 or other ratio, depending on the UL and DL traffic in the network. For example, one or more DL subframes may occur first in a frame for the BS 104 to transmit broadcast and unicast information to MSs, followed by one or more UL subframes that may allow one or more of the MSs opportunities or resources to transmit UL to the BS 104.

Referring to FIG. 2 again, the first subframe (subframe 0 in FIG. 2) of each superframe is typically allocated for downlink transmission. Each superframe may include a superframe header (SFH) that is included in the first subframe of the superframe (subframe 0) of the first frame (frame 0) of the superframe. The SFH may include a number of fields, including a broadcast channel (BCH) 212. The BCH 212 may be used by the BS 104 to broadcast to all MSs or provide essential system parameters and system configuration information 214. The BCH 212 may include a primary broadcast channel (PBCH) and a secondary broadcast channel (SBCH). The PBCH may carry deployment wide (or network wide) common information from the BS, while the SBCH may carry sector specific information, where MSs in wireless network 102 may be divided into different sectors. In an example embodiment, the BCH 212 may be frequency division multiplexed with data within the same subframe (subframe 0).

As noted, BCH 212, e.g., provided within a first subframe of a superframe, may include system configuration information 214. System configuration information 214 may include or describe the system configuration of one or more (or each) of the subframes of a superframe. In some cases, the system configuration information 214 may be considered essential for decoding subframes. System configuration information 214 may include, for example, DL/UL ratio for subframes within the superframe (e.g., first 5 subframes are for DL, and last 3 subframes are for UL), subframe concatenation pattern for a superframe, the configuration information of localized resource allocations (LRAs) and distributed resource allocations (DRAs) within a subframe (which may allocate resources for UL or DL transmissions), permutation method for subcarriers, and/or other system configuration information.

As shown in FIG. 2, each subframe may include other data and control information. Although, FIG. 2 only shows the other data and control information for subframe 0, each subframe may include other data and control information. For example, each subframe may include scheduling information that may schedule, assign or allocate resources to each of the MSs for UL or DL transmissions. The scheduling information in a subframe may allocate or assign resources to a MS for the same subframe, or a future subframe, as examples.

In an example embodiment, the scheduling information may be provided in (or as part of) a unicast service control channel or a Map message. These are merely some examples, and the scheduling information may be provided in a number of different formats, or may be known by different names. The scheduling information may include, for example, MS-specific (e.g., user-specific or connection-specific) scheduling assignments to assign or allocate UL or DL resources to different MSs. The scheduling assignments may be for unicast transmissions (either uplink or downlink), or DL multicast or broadcast transmissions (e.g., where a MS may be a member of one or more multicast groups).

For example, the MS-specific scheduling information that identifies UL resources for a MS may identify UL resources (e.g., time slot and/or subcarriers or other resources) assigned or allocated to the MS to allow the MS an opportunity to transmit UL to the BS, e.g., in a same or different subframe of the same frame or a next frame, as examples. Similarly, the MS-specific scheduling information that assigns DL resources to a MS may identify resources (e.g., time slot and/or subcarriers) within a current subframe or a future subframe (e.g., next subframe) for which the BS will transmit data to the MS. Thus, during such time period specified by the scheduling assignment or resource allocation, the MS should typically be in a non-sleep (or active) mode or listening window so that the MS may receive the data via the designated resources. Otherwise, if the MS is in sleep window during this period, the BS may transmit data (or other information) to the sleeping MS, and the data or other information may be lost (not received by the MS), for example.

Figure 3:
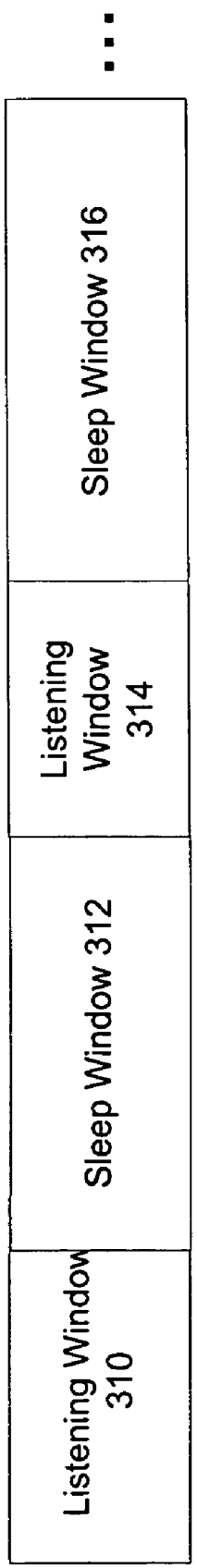
FIG. 3 is a block diagram illustrating operation of a mobile station according to an example embodiment.

FIG. 3 is a block diagram illustrating operation of a mobile station according to an example embodiment. In an example embodiment, a MS (mobile station) may alternate between a listening window, where the MS may receive data and may transmit data, and a sleep window, where the MS may power down one or more components such that the MS is unable to receive or transmit data, and the BS (base station) typically does not transmit data to the MS during a sleep mode. Each sleep window and listening window may be one or more frames, for example. The length of each sleep window or listening window may be specified by the BS, or may be negotiated between the MS and BS, as examples. For example, as shown in FIG. 3, a MS may initially operate in a listening window 310, then in a sleep window 312, then a listening window 314, and then a sleep window 316, etc.

According to an example embodiment, a MS may use an initial sleep window size. If there is no traffic (e.g., data and/or control information) exchanged between the MS and BS during a next listening window, then the size of the following (or next) sleep window may be increased to allow for greater power savings. For example, if a MS has an initial sleep window size of 3 frames assigned to it by the BS, then, e.g., if no traffic is exchanged between the MS and BS in the next listening window, then the following or next sleep window may be doubled to 6 frames (e.g., 2 times the initial sleep window size). Each sleep window may be increased (e.g., doubled) if there was no MS-specific traffic sent to the MS or received from the MS during the previous listening window. Thus, if no MS-specific traffic occurs in each listening window, then each sleep window may double, e.g., 3 frames (the initial sleep window size), 6 frames (2× initial sleep window size), 12 frames (4× initial sleep window size), etc., up to a maximum sleep window size. Alternatively, each sleep window size may increase to a higher multiple of the initial sleep window size, e.g., 2× (two times the initial sleep window size), 3×, 4×, 5×, 6×, . . . up to a maximum sleep window size. According to an example embodiment, if MS-specific traffic (e.g., traffic or packets transmitted to or addressed to the MS, or received from the MS) occurs during a listening window, then the next sleep window is reset to the initial sleep window size (3 frames in the above example).

According to an example embodiment, both the BS and the MS may either increase the size of the next sleep window, or reset the size of the next sleep window to the initial sleep window size, depending on whether MS-specific traffic occurs in the previous listening window. According to an example embodiment, one way to determine whether MS-specific traffic occurs within a listening window is whether the BS allocates or assigns UL or DL resources for the MS (MS-specific resource allocation), e.g., by transmission of scheduling information. Thus, if the BS transmits scheduling information to a MS during a subframe within a listening window, this may, for example, allocate or identify either DL resources for the BS to transmit to the MS, or allocate UL resources to allow the MS to transmit to the BS. In such case, e.g., based on the scheduling information (or based on the allocation of resources to the MS via the scheduling information) both the MS and the BS should reset the size of the next sleep window for the MS to the initial sleep window size. Different MSs may have different sleep windows and listening windows.

However, a problem can arise where the BS transmits scheduling information (e.g., for a subframe within a listening window) to a MS, but the MS does not receive the scheduling information, e.g., the MS is unable to decode the scheduling information due to signal errors, a deep fade of the received signal, or other problem. In such case, the BS may reset the size of the next sleep window to the initial sleep window size. However, since the MS did not receive the scheduling information for the MS (and therefore, may typically be unaware of any data to be transmitted to the MS via the allocated resources), the MS may then increase (e.g., double) the size of its next sleep window. Thus, as a result, the MS and BS will determine two different sizes for the next sleep window for the MS. This will cause the MS and BS to identify two different starting points for the next listening window (at the end of the next sleep window). As a result, the MS may lose synchronization with the BS, since the BS may then transmit scheduling information (or data) to the MS while the MS is in sleep mode (since the MS increased the size of the next sleep window, while the BS may have typically decreased the sleep window size by resetting it based on the transmission of the scheduling information to the MS). As a result of this loss of synchronization, and the MS may be required to perform network re-entry (to re-obtain synchronization with the BS), likely causing a service interruption for the MS.

Figure 4:
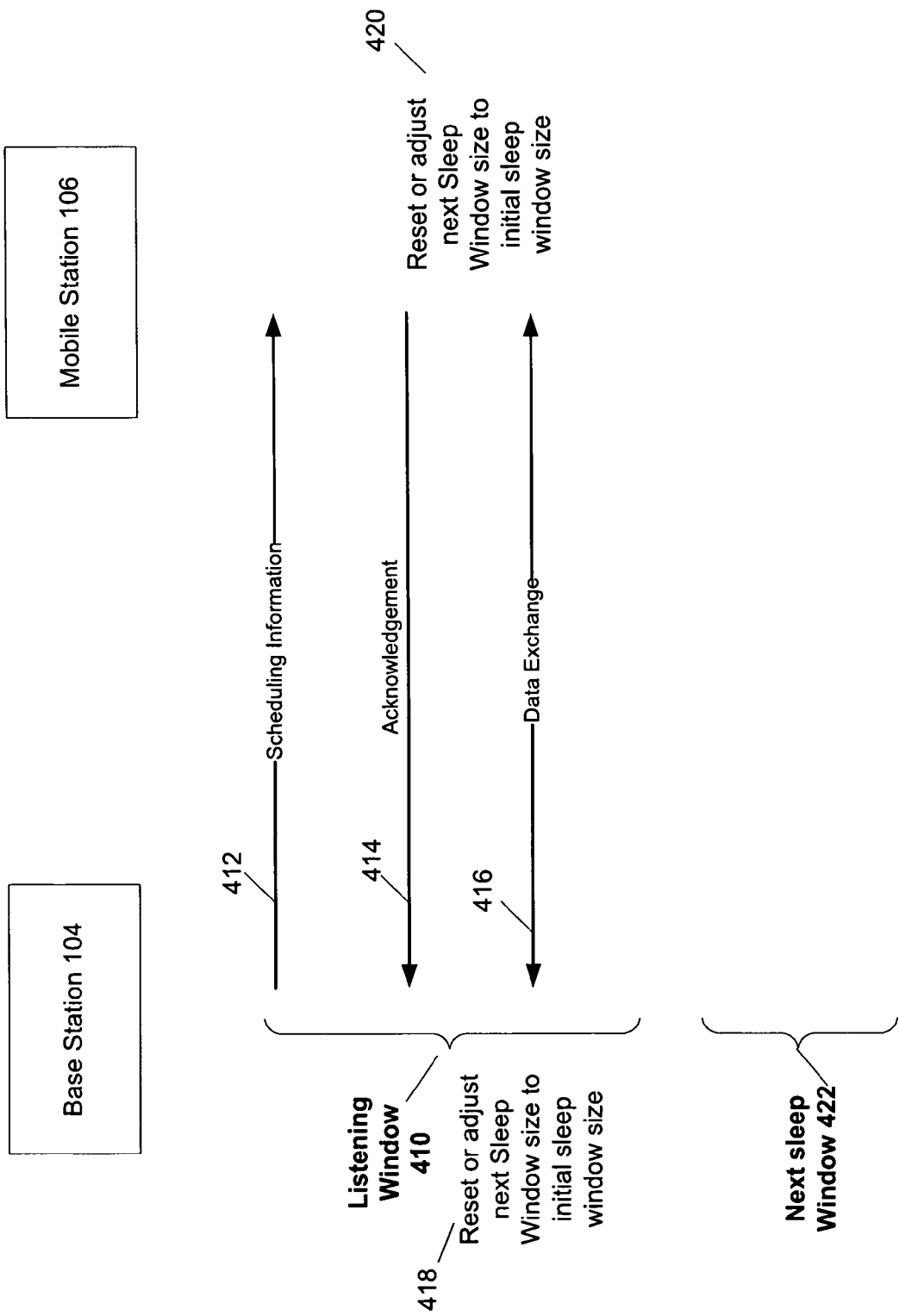
FIG. 4 is a timing diagram that illustrates operation according to an example embodiment.

Therefore according to an example embodiment, a MS may transmit to the BS an acknowledgement to acknowledge receipt of a scheduling information. FIG. 4 is a timing diagram that illustrates operation according to an example embodiment. A listening window 410 is shown. At 412, BS 104 transmits scheduling information to the MS 106. The scheduling information may, for example, include a Map message or a scheduling assignment, or other resource allocation, to allocate UL or DL resources to the MS. At 412, the BS may also transmit a signal or information element (e.g., Map IE or Ack Request IE) that requests the MS to send an acknowledgement to the BS via an allocated Ack channel, for example. This may allow the BS to notify the MS of cases where the MS should send an acknowledgement to the BS. At 412, the BS may also transmit a scheduling resource that allocates resources for the MS to transmit the acknowledgement. These allocated resources for the acknowledgement may be referred to as the acknowledgement channel, for example.

At 414 the MS 106 transmits (or sends) an acknowledgement to the BS 104. The acknowledgement may be sent, e.g., in response to receiving the scheduling information and/or in response to receiving a request for the acknowledgement, and may be sent to the BS via the allocated or reserved acknowledgement channel, according to example embodiments, although not required.

At 420, in response to receiving/decoding the scheduling information (that allocates resources to the MS), the MS 106 resets (or adjusts) the next sleep window 422 for the MS to the initial sleep window size. Likewise, at 418, after receiving the acknowledgement from MS 106 (via 44), the BS 104 resets (or adjusts) the size of the next sleep window 422 for the MS to the initial sleep window size. Thus, the use of the acknowledgement (at 414) sent from the MS 106 to the BS 104 may decrease the likelihood for a miscommunication between the BS and MS with respect to the size of the next sleep window (e.g., which may result in the MS and BS determining different sleep window sizes, which may typically cause the MS and BS to become unsynchronized).

Although not required, according to an example embodiment, if the BS 104 does not receive the acknowledgement (at 414), e.g., after a timeout after sending the scheduling information to the MS, the BS may repeat, one or more times, transmitting a scheduling information to the MS, until either the BS receives an acknowledgement from the MS (e.g., via an allocated Ack channel) or the end of the current listening window 410 is reached. For example, the BS may send scheduling resources in each subframe within listening window 410, and may include an Ack request IE (requesting an acknowledgement) and/or allocate or provide an acknowledgment channel for the scheduling information of the first subframe, and then if no acknowledgement is received, then the BS may include an Ack request IE and allocated Ack channel for the second subframe of the listening window 410, and if no acknowledgement is received by the BS for that request, then the BS may provide the Ack request IE and Ack channel for the third subframe, etc. until either an acknowledgement is received at the BS or the end of the listening window is received.

In an example embodiment, after an Ack (acknowledgement) has been received by the BS for a scheduling resource (and/or in response to an Ack request), the BS may typically not include a Ack request IE (requesting an acknowledgement) or allocate an Ack channel for subsequent or further transmissions of scheduling resources within the same listening window 410 (since the BS has already been notified that the MS is aware of MS-specific traffic for this listening window, which means that the MS will reset size of next sleep window 422 to the initial sleep window size based on the occurrence of MS-specific traffic within listening window 410).

If BS 104 does not receive an acknowledgement by the end of the listening window 410, the BS 104 may assume that the MS 106 has not received the scheduling information, and the BS 106 may then increase the size of the next sleep window 422 (e.g., because it may be assumed based on the failure to received the Ack that the MS did not receive the scheduling information, and as a result, the MS will likely increase the size of its next sleep window). Thus, in such case, to keep the BS and MS synchronized, the BS will also increase the size of the next sleep window 422 for the MS.

At 416, the MS and BS may exchange data via the allocated UL and/or DL resources. This may include, for example, the BS transmitting data (or other signals) to the BS via DL resources indicated by the scheduling information that was sent to the MS, or may include the MS sending data or other signals to the BS via allocated UL resources (indicated by the scheduling information for example).

According to an example embodiment, the MS may be required to acknowledge only one scheduling information received within a listening window. For example, a scheduling information (e.g., Map message or unicast service control channel) may be provided within each of one or more subframes within a listening window. The BS may, for example, allocate an acknowledgement channel to allow the MS to acknowledge receipt of the scheduling information for one of the subframes, e.g., for the first subframe, or subframe 0, according to an example embodiment. For example, any subframe within a listening window may be selected to request the acknowledgement/or allocate an Ack channel.

In an example embodiment, the MS may send an acknowledgement in response to receiving a DL resource allocation within a listening window. If a MS received an UL resource allocation (to allow the MS to transmit to the MS, the BS may be notified of the MS's receipt of the UL resource allocation (scheduling information including the UL resource allocation) when the MS uses the UL resource allocation to transmit data or other signal to the BS, for example. Thus, in the case where a listening window includes the BS transmitting a scheduling information that provides an UL resource allocation to the MS, it may not be necessary for the MS to acknowledge this scheduling information since the MS will implicitly acknowledge receipt of such scheduling information by transmitting data or other signal to the BS via the allocated UL resource, for example. Thus, according to an example embodiment, the MS may acknowledge receipt of a scheduling information that provides a DL resource allocation within a listening window, e.g., where the MS is not using an allocated UL resource allocation to transmit to the BS within the same window. Thus, for example, in an example embodiment, it may be desirable for the MS to explicitly acknowledge receipt of a scheduling information for a DL resource allocation where the MS does not receive or respond to a UL resource allocation within the same listening window, according to an example embodiment. This is because, for example, receipt at the BS of an UL transmission from the MS (e.g., in response to an UL allocation) within a listening window 410 indicates to the BS that the MS will reset the size of its next sleep window 422 to the initial sleep window size.

In an example embodiment, it may be unnecessary to acknowledge the scheduling information if HARQ (Hybrid ARQ) transmission mode is used for the BS to send data to the MS, since, for example, a HARQ Ack/Nak channel may provide the MS with a channel to acknowledge or negatively acknowledge receipt of the data (and hence, providing an indication or not, of whether the MS will reset or increase the size of the next sleep window 422). Thus, according to an example embodiment, the acknowledgement described above may be especially useful where the BS transmits data to the MS via a non-HARQ (non-Hybrid ARQ) transmission.

According to an example embodiment a listening window may be extended, e.g., by one or more frames to accommodate traffic or increased traffic during the listening window. The amount of extension (m) added to the current listening window may be a fixed (or selected or configurable) extension amount (m), which may be applied to extend the current listening window, e.g., if there is any traffic in the unextended portion of the listening window or traffic that exceeds a threshold, as examples. The amount of the extension (m) may be selected by the BS (e.g., in advance) and then the BS may notify the MS of the extension amount, which may be applied by both the MS and BS if a condition is fulfilled, e.g., traffic (or a threshold amount of traffic) occurs within the un-extended listening window, for example.

Alternatively the current listening window may be flexibly extended by an amount (m) based on (or in accordance with) an amount of traffic occurring or communicated between the BS and MS during the current listening window. For example, the MS and BS may exchange traffic during the listening interval. The listening window may be extended as long as there is DL or UL data traffic between the MS and BS. Once the listening window is entered (or has started), a timer (set to an initial value) is started (e.g., decrementing), and the timer is reset if any traffic reception/transmission is performed. If the timer expires (e.g., due to no additional traffic at that point between MS and BS), the listening window is not further extended and the MS may enter sleep mode until the next scheduled listening window. This is merely another example, and the amount of the extension (m) of the listening window may be determined or calculated using a number of different techniques, as these are just a few possible techniques to determine an extension (m) to the listening window, and the disclosure is not limited thereto.

When the current listening window is extended, this may typically change the starting point and length of the next sleep window, and as a result, may change a starting location of a next listening window. The starting location of the next listening window should be determined, even after the current listening window has been extended, to maintain the synchronization between the MS and BS.

Figure 5:
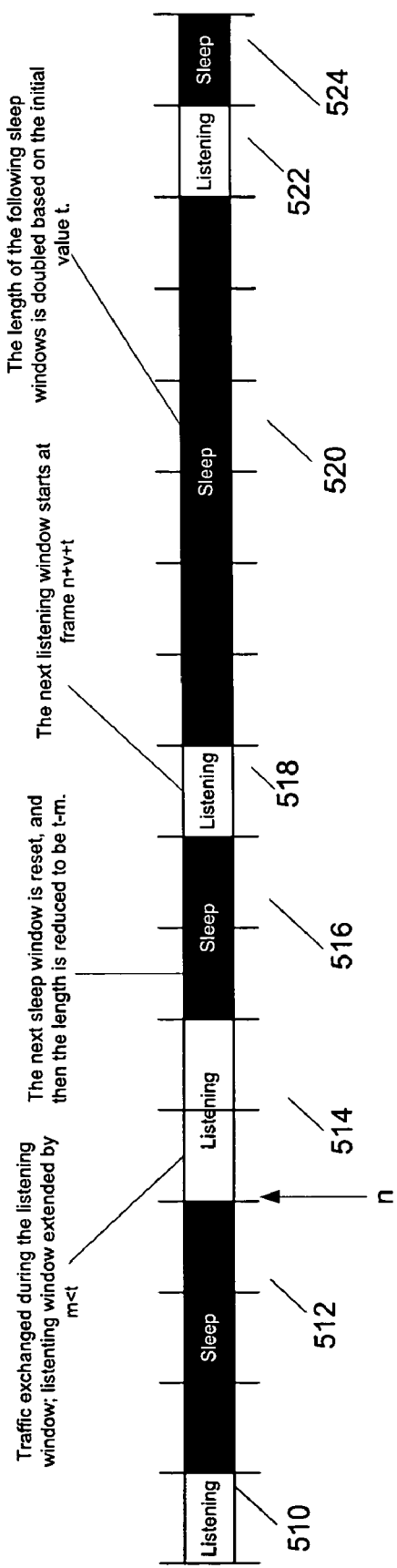
FIG. 5 is a diagram illustrating operation of a wireless node in a case where the extension (m) of the current listening window is less than the initial sleep window size (t).

FIG. 5 is a diagram illustrating operation of a wireless node in a case where the extension (m) of the current listening window is less than the initial sleep window size (t). A number of listening windows (510, 514, 518 and 522) and sleep windows (512m 516m 520 and 524) are shown in FIG. 5, with each window being one or more frames in length. A first listening window 510 has an unextended length (v) of 1 frame. Sleep window 512 has an initial sleep window size (t) of three (3) frames.

Next, traffic is exchanged between the MS and BS during listening window 514, which causes the listening window 514 to be extended by m frames, where m is the extension of the current listening window. In this example, the extension (m) of the current listening window 514 is 1 frame, which is less than the initial sleep window size (t) which is 3 frames. Thus, m<t in the example shown in FIG. 5. The length of the next sleep window 516 would normally be 3 frames, but it is reduced to t−m due to the extension m of the listening window 514, according to this example. Thus, sleep window 516 has a length of 2 frames in the example shown in FIG. 5. The next listening window 518 starts at frame n+v+t, where n is the starting point of the current listening window 514, v is the unextended length of a listening window, which is 1 frame in this example, and t is the initial sleep window size, which is 3 frames in this example. Thus, n is at the beginning of listening window 514, v=1, and t=3, and v+t=4. Therefore, the starting point of the next listening window 518 is 4 frames after the beginning of listening window 514, according to this example.

In general, the following equations may be used:

Length of the next sleep window=(k+1)*t−m (Eqn. 1), where m is the extension of the current listening window, t is the initial sleep window size, and k is a non-negative (zero or greater) integer based on the following:

$$k*t \leq m < (k+1)*t.$$ (Eqn. 2)

The starting location of the next listening window=n+v+(k+1)*t (Eqn. 3), where n is the starting point of the current listening window, v is the length of an unextended listening window, m is an extension of the current listening window, and k is a non-negative integer (zero or greater) provided by Eqn. 2.

For the case where m<t, from Eqn. 2, it can be shown that k=0. Thus, Eqn. 1 simplifies, for m<t, to: Length of the next sleep window=t−m (Eqn. 1A). Also, Eqn. 3 simplifies to: The starting location of the next listening window=n+v+t (Eqn. 3A).

Thus, as shown in FIG. 5, which illustrates flexibly extending of listening window, there is traffic during listening window 514, and the listening window 514 is extended by m=1 frame. The length of the next sleep window 516=t−m=3−1=2 frames.

If there is no traffic in the next listening window 518, then the next sleep window 520 will be doubled based on the size of t, e.g., 2t (size of 6 frames, since t=3 in this example), and next sleep windows may be doubled in length if no traffic in their prior listening windows, e.g., 4t, 8t, etc., up to a maximum sleep window size. Sleep window 520 has a length of 2t which is 6 frames. Listening window 522 is not extended, and therefore, is a length of 1 frame. Each sleep window may be reset to the initial sleep window size if there is traffic in the previous listening window (but this reset length may be adjusted if the previous listening window is extended, as noted above).

Figure 6:
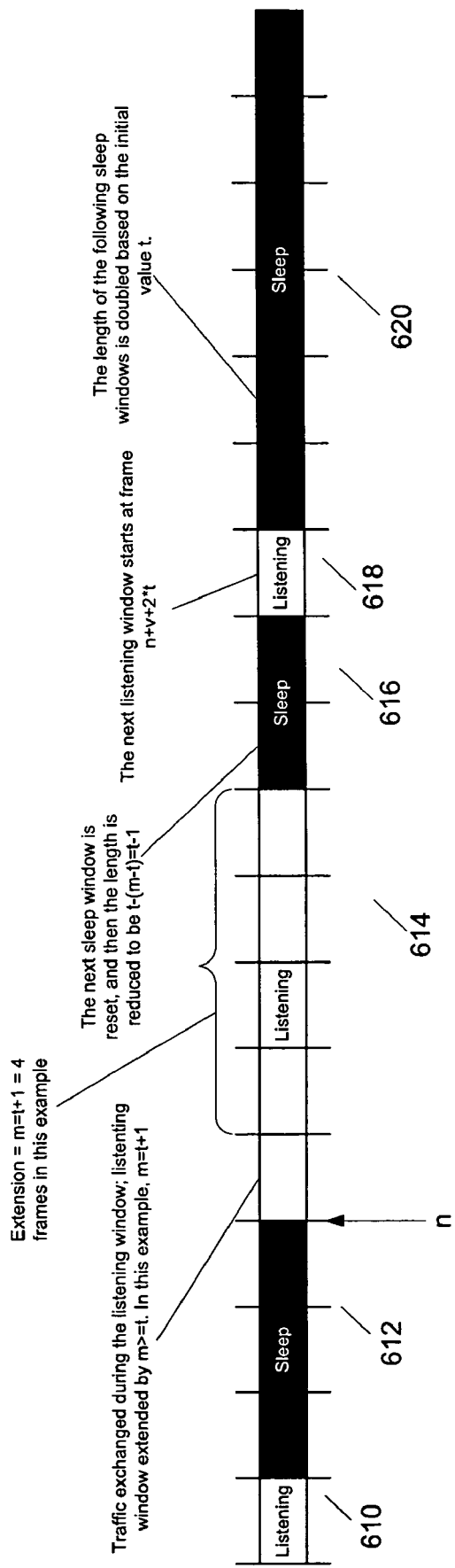
FIG. 6 is a diagram illustrating operation of a wireless node in a case where the extension (m) of the current listening window is greater than or equal to the initial sleep window size (t).

FIG. 6 is a diagram illustrating operation of a wireless node in a case where the extension (m) of the current listening window is greater than or equal to the initial sleep window size (t): m≥t. Listening windows (610, 614, and 618) and sleep windows (612, 616 and 620) are shown in FIG. 6. In such case, where m≥t, k is a positive integer (1 or greater). Unextended listen window length (v) is 1 frame (see listening window 610). Initial sleep window size (t)=3 frames, see sleep window 612. Traffic is exchanged during listening window 614, which causes listening window 614 to be extended by m=t+1=4 frames. The next sleep window 616 is reset to 3, but the length is reduced due to the extension of listening window 614. The length of sleep window 616 is reduced to t−(m−t)=t−1=2 frames. The next listening window 618 starts at frame n+v+2*t. The length of the following sleep windows may be doubled based on the initial sleep window size (t), if the previous listening window has no MS/BS traffic exchanged. The next listening window 618 and sleep window 616 are shifted k*t frames as compared to the m<t case shown in FIG. 5.

According to an example embodiment, a technique is provided for determining a starting location of a next listening window for a mobile station in a wireless network may include: communicating traffic between the mobile station and a base station during a current listening window; determining, based on the communicating, an extension (m) of the current listening window; determining a length of a next sleep window based on the extension (m) of the current listening window and an initial sleep window size (t); and determining a starting location of the next listening window based on the starting point (n) of the current listening window, a length (v) of an unextended listening window, the extension (m) of the current listening window and the initial sleep window size (t).

In an example embodiment, the determining a length of a next sleep window based on the extension (m) of the current listening window and the initial sleep window size (t) may include determining the length of the next sleep window based approximately on the following: Length of next sleep window=(k+1)*t−m, where m is the extension of the current listening window, t is the initial sleep window size, and k is an integer based on the following: k*t≤m<(k+1)*t.

In another example embodiment, the determining a starting location of the next listening window based on the starting point (n) of the current listening window, a length (v) of an unextended listening window, the extension (m) of the current listening window and the initial sleep window size (t) may include determining the starting location of the next listening window based approximately on the following: Starting location of the next listening window=n+v+(k+1)*t, where n is the starting point of the current listening window, v is the length of an unextended listening window, m is an extension of the current listening window, and k is a positive integer provided by the following: $k*t \leq m<(k+1)*t$.

Figure 7:
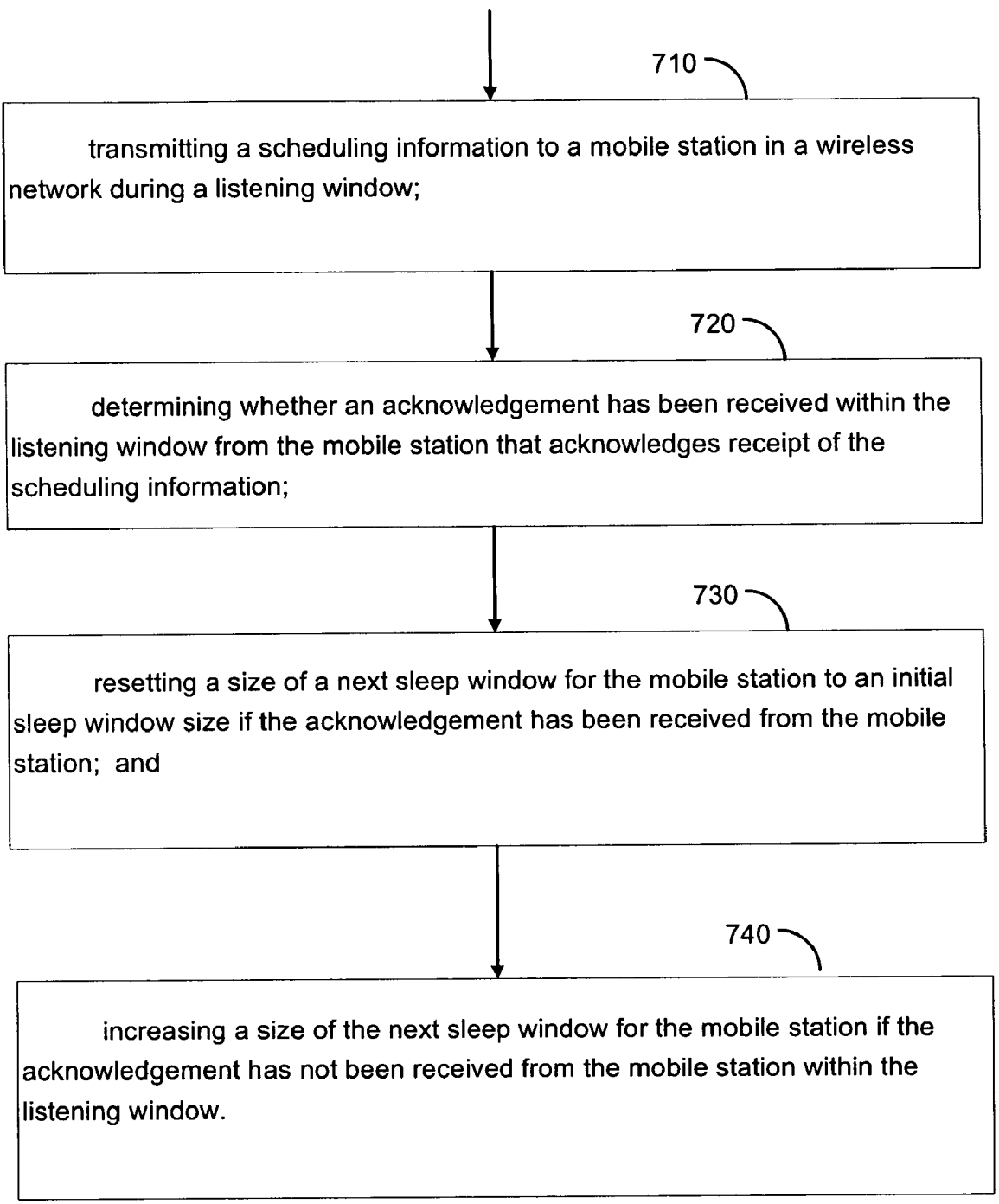
FIG. 7 is a flow chart illustrating operation of a base station according to an example embodiment.

FIG. 7 is a flow chart illustrating operation of a base station according to an example embodiment. Operation 710 may include transmitting a scheduling information to a mobile station in a wireless network during a listening window. Operation 720 may include determining whether an acknowledgement has been received within the listening window from the mobile station that acknowledges receipt of the scheduling information. Operation 730 may include resetting a size of a next sleep window for the mobile station to an initial sleep window size if the acknowledgement has been received from the mobile station. And, operation 740 may include increasing a size of the next sleep window for the mobile station if the acknowledgement has not been received from the mobile station within the listening window.

In the flow chart of FIG. 7, the scheduling information may include a scheduling assignment, a Map message or other resource allocation to assign or allocate resources to the mobile station for either uplink or downlink transmission.

In the flow chart of FIG. 7, the transmitting operation 710 may include transmitting a scheduling assignment via a unicast service control channel to assign or allocate resources to the mobile station for either uplink or downlink data transmission.

In the flow chart of FIG. 7, the transmitting operation 710 may include transmitting a scheduling assignment to the mobile station via a non-HARQ (non-Hybrid ARQ) transmission.

In the flow chart of FIG. 7, the transmitting operation 710 may include transmitting a scheduling information to a mobile station in a wireless network, the scheduling information including a scheduling information to allocate or schedule a downlink transmission to the mobile station and to allocate uplink resources for the mobile station to transmit the acknowledgement that acknowledges receipt of the scheduling information.

In the flow chart of FIG. 7, the transmitting operation 710 may include transmitting a scheduling information to a mobile station in a wireless network, the scheduling information including a first scheduling information to allocate resources for a downlink transmission to the mobile station.

In the flow chart of FIG. 7, the transmitting operation 710 may include transmitting a scheduling information to a mobile station in a wireless network, the scheduling information including a scheduling information to allocate resources for a mobile station; and repeating, one or more times, the transmitting of the scheduling information if an acknowledgement is not received from the mobile station within a timeout period, until either the end of the listening window is reached or an acknowledgement from the mobile station is received.

In the flow chart of FIG. 7, the increasing operation 740 may include doubling a size of the next sleep window for the mobile station if the acknowledgement has not been received from the mobile station within the listening window.

According to another example embodiment, an apparatus may include a wireless transceiver; and a controller coupled to the transceiver. The wireless transceiver may be configured to transmit a scheduling information to a mobile station in a wireless network during a listening window. The controller may be configured to determine whether an acknowledgement has been received within the listening window from the mobile station that acknowledges receipt of the scheduling information, reset a size of a next sleep window for the mobile station to an initial sleep window size if the acknowledgement has been received from the mobile station, and increase a size of the next sleep window for the mobile station if the acknowledgement has not been received from the mobile station within the listening window.

Figure 8:
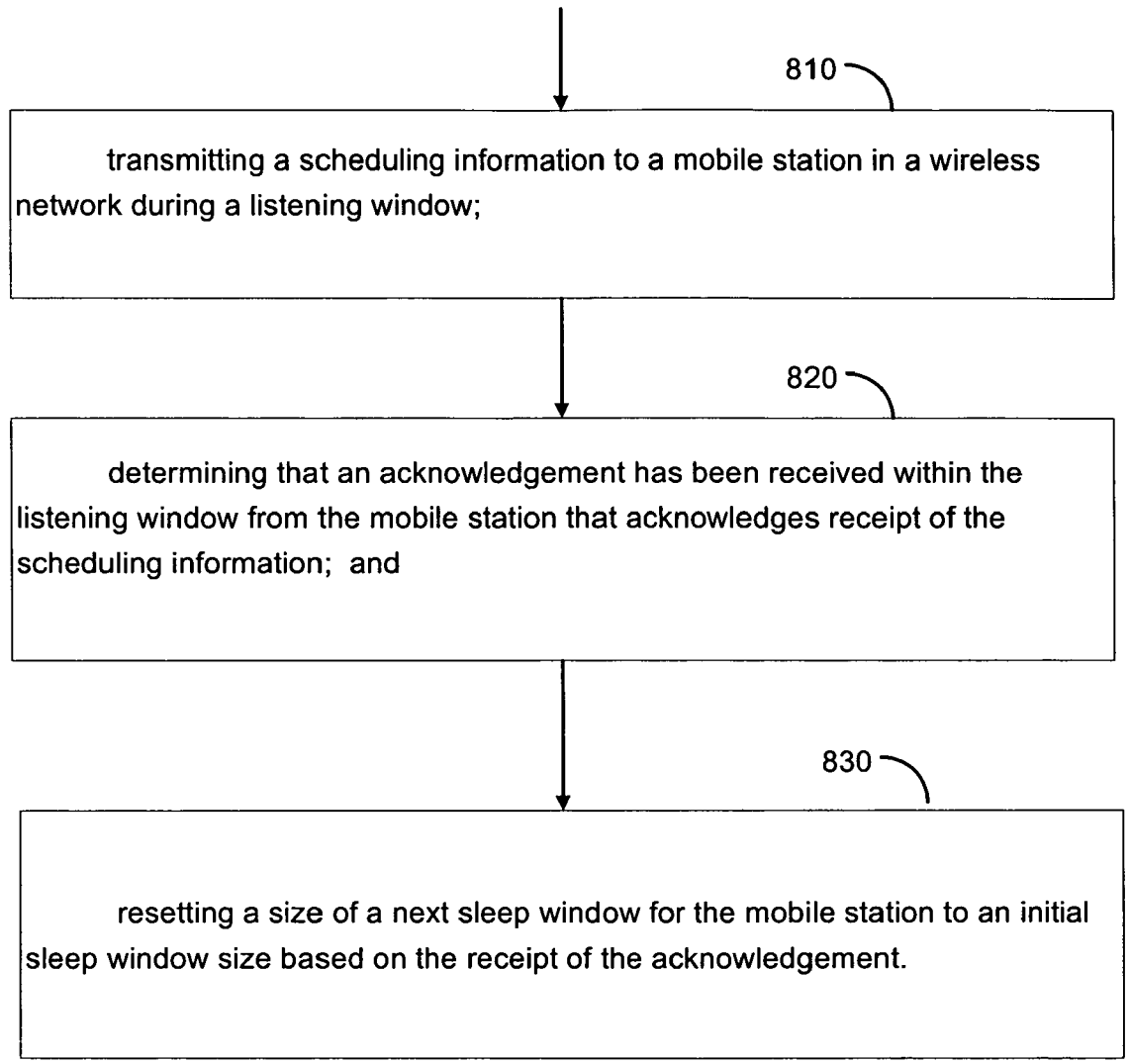
FIG. 8 is a flow chart illustrating operation of a base station according to an example embodiment.

FIG. 8 is a flow chart illustrating operation of a base station according to an example embodiment. Operation 810 may include transmitting a scheduling information to a mobile station in a wireless network during a listening window. Operation 820 may include determining that an acknowledgement has been received within the listening window from the mobile station that acknowledges receipt of the scheduling information. And, operation 830 may include resetting a size of a next sleep window for the mobile station to an initial sleep window size based on the receipt of the acknowledgement.

According to another example embodiment, an apparatus may include a wireless transceiver and a controller coupled to the transceiver. The wireless transceiver may be configured to transmit a scheduling information to a mobile station in a wireless network during a listening window. The controller may be configured to: determine that an acknowledgement has been received within the listening window from the mobile station that acknowledges receipt of the scheduling information, and reset a size of a next sleep window for the mobile station to an initial sleep window size based on the receipt of the acknowledgement.

Figure 9:
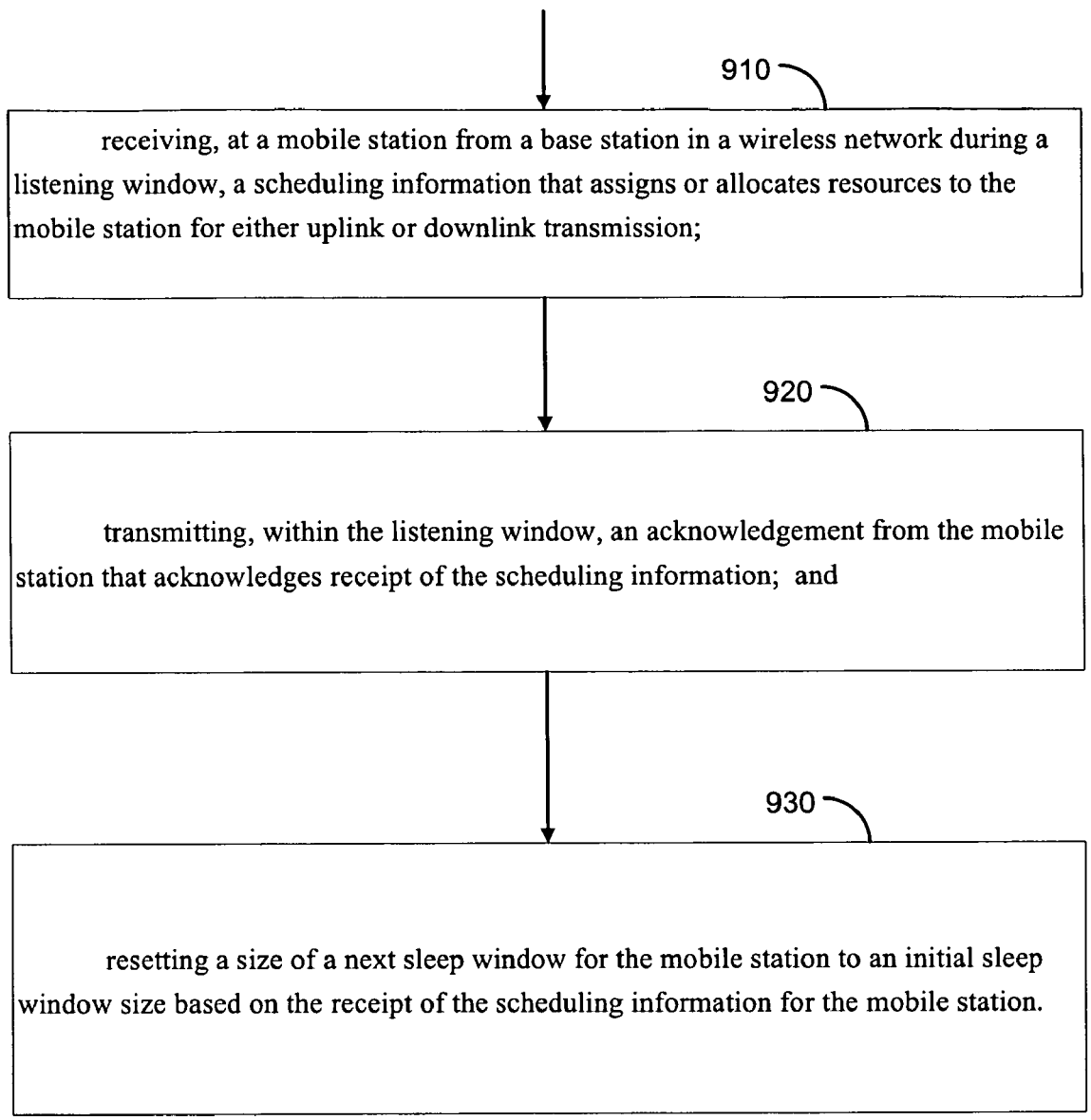
FIG. 9 is a flow chart illustrating operation of a mobile station according to an example embodiment.

FIG. 9 is a flow chart illustrating operation of a mobile station according to an example embodiment. Operation 910 may include receiving, at a mobile station from a base station in a wireless network during a listening window, a scheduling information that assigns or allocates resources to the mobile station for either uplink or downlink transmission. Operation 920 may include transmitting, within the listening window, an acknowledgement from the mobile station that acknowledges receipt of the scheduling information. Operation 930 may include resetting a size of a next sleep window for the mobile station to an initial sleep window size based on the receipt of the scheduling information for the mobile station.

Figure 10:
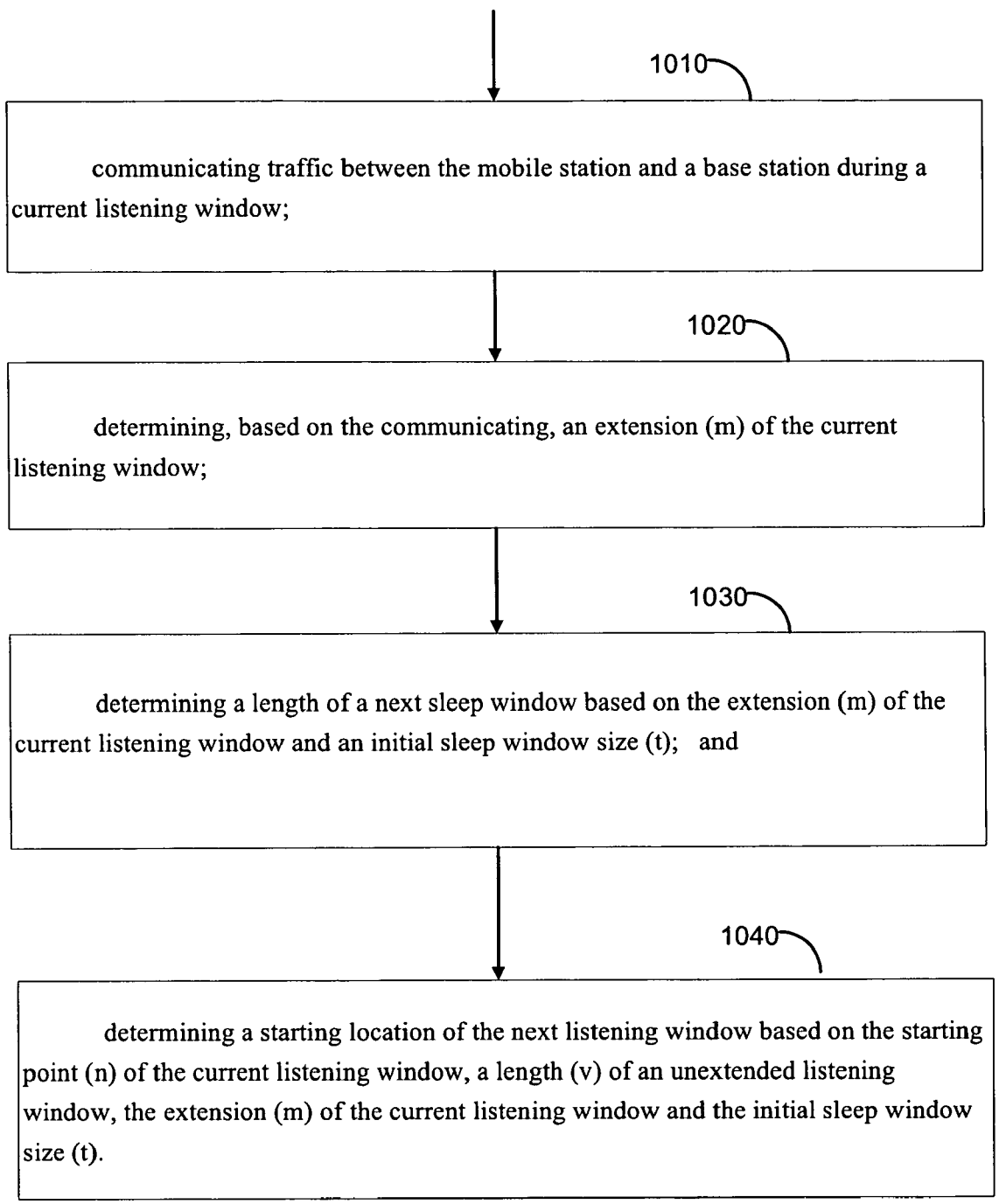
FIG. 10 is a flow chart illustrating operation of a wireless node according to an example embodiment.

FIG. 10 is a flow chart illustrating operation of a wireless node according to an example embodiment. The flow chart of FIG. 10 may illustrate determining a starting location of a next listening window for a mobile station in a wireless network. Operation 1010 may include communicating traffic between the mobile station and a base station during a current listening window. Operation 1020 may include determining, based on the communicating, an extension (m) of the current listening window. Operation 1030 may include determining a length of a next sleep window based on the extension (m) of the current listening window and an initial sleep window size (t). And, operation 1040 may include determining a starting location of the next listening window based on the starting point (n) of the current listening window, a length (v) of an unextended listening window, the extension (m) of the current listening window and the initial sleep window size (t).

In an example embodiment, operation 1020 may include determining, based on the communicating, an extension (m)

of the current listening window, where the listening window extension (m) is greater than or equal to the initial sleep window size (t).

In an example embodiment, operation 1020 may include determining, based on the communicating, an extension (m) of the current listening window, where the listening window extension (m) is less than the initial sleep window size (t).

In an example embodiment, operation 1010 may include transmitting and/or receiving either scheduling information and/or data during a current listening window.

In an example embodiment, operation 1010 may include transmitting, from the base station, scheduling information that assigns or schedules resources for the mobile station for at least one subframe of the current listening window.

In an example embodiment, operation 1010 may include receiving, at the mobile station from the base station, scheduling information that assigns or schedules resources for the mobile station for at least one subframe of the current listening window.

In an example embodiment, in the flow chart of FIG. 10, the current listening window is flexibly extended by the extension (m) based on an amount of traffic communicated between the base station and mobile station during the current listening window.

In an example embodiment, operation 1030 may include determining the length of the next sleep window based approximately on the following:

Length of next sleep window=$(k+1)*t-m$, where m is the extension of the current listening window, t is the initial sleep window size, and k is an integer based on the following: $k*t \leq m < (k+1)*t$.

In an example embodiment, operation 1040 may include determining the starting location of the next listening window based approximately on the following: Starting location of the next listening window=$n+v+(k+1)*t$, where n is the starting point of the current listening window, v is the length of an unextended listening window, m is an extension of the current listening window, and k is a positive integer provided by the following: $k*t \leq m < (k+1)*t$.

In another example embodiment, an apparatus may include a wireless transceiver, and a controller coupled to the transceiver. The wireless transceiver may be configured to transmit or receive traffic during a current listening window. And, the controller may be configured to determine an extension (m) of the current listening window; determine a length of a next sleep window based on the extension (m) of the current listening window and an initial sleep window size (t); and determine a starting location of the next listening window based on the starting point (n) of the current listening window, a length (v) of an unextended listening window, the extension (m) of the current listening window and the initial sleep window size (t).

In an example embodiment, the listening window extension (m) may be greater than or equal to the initial sleep window size (t).

In an example embodiment, the listening window extension (m) may be less than the initial sleep window size (t).

Figure 11:
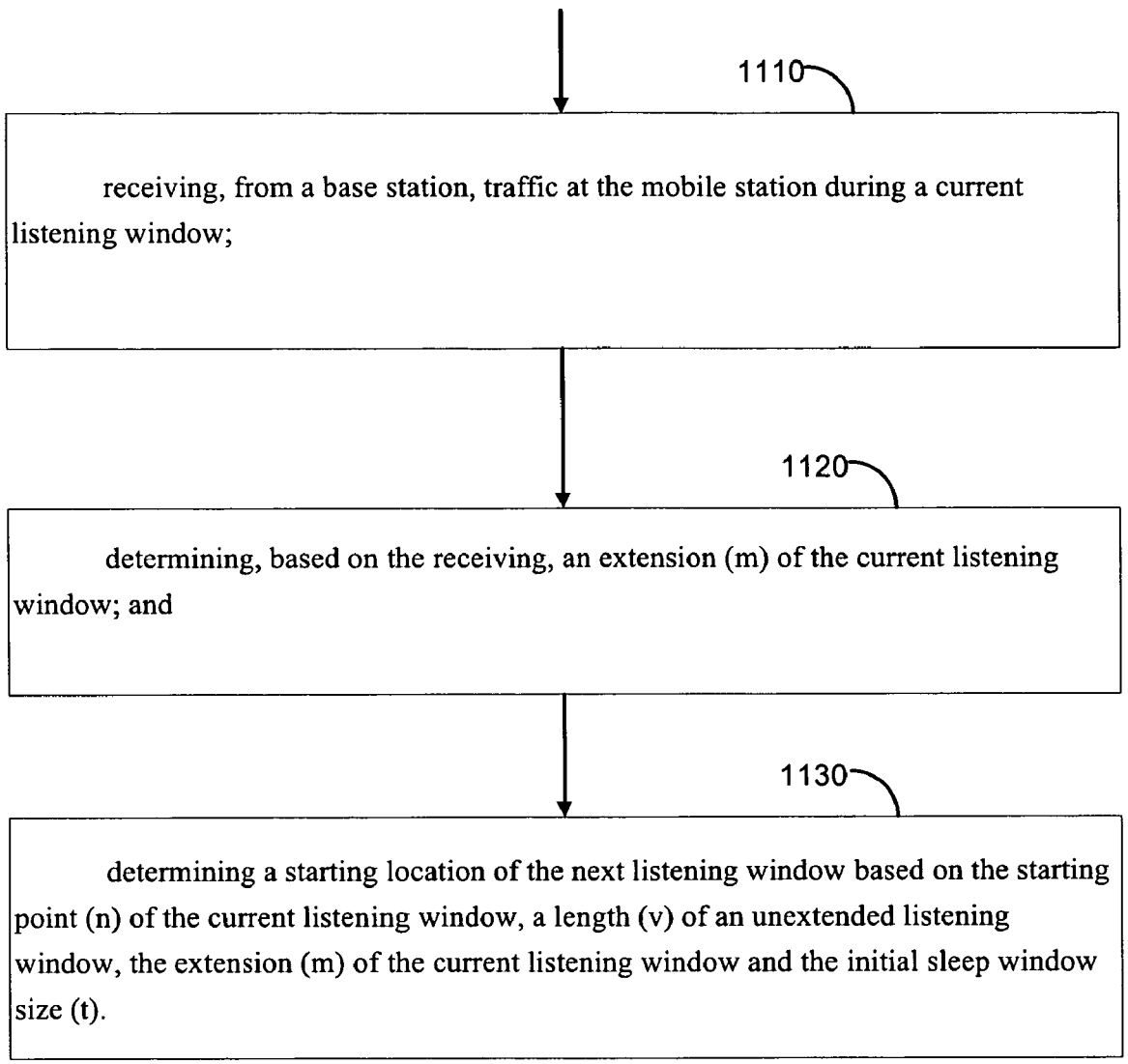
FIG. 11 is a flow chart illustrating operation of a mobile station according to an example embodiment.

FIG. 11 is a flow chart illustrating operation of a mobile station according to an example embodiment. The flow chart of FIG. 11 may include a method of determining a starting location of a next listening window for a mobile station in a wireless network. Operation 1110 may include receiving, from a base station, traffic at the mobile station during a current listening window. Operation 1120 may include determining, based on the receiving, an extension (m) of the current listening window. And, operation 1130 may include determining a starting location of the next listening window based on the starting point (n) of the current listening window, a length (v) of an unextended listening window, the extension (m) of the current listening window and the initial sleep window size (t).

Operation 1120 may include receiving a message from the base station that identifies the extension (m).

Operation 1110 may include receiving, from a base station, scheduling information that assigns or allocates resources to the mobile station for either uplink or downlink transmission.

Operation 1110 may include receiving, from a base station, a first scheduling information provided in a first subframe that assigns or allocates resources to the mobile station for downlink transmission to the mobile station, and a second scheduling information that assigns or allocates uplink resources for the mobile station to transmit to the base station an acknowledgement that acknowledges the mobile station receiving the first scheduling information.

In an example embodiment of the flow chart of FIG. 11, the traffic may include at least a resource allocation or scheduling assignment that assigns or allocates to the mobile station either uplink or downlink resources. The flow chart may include one or more additional operations, including transmitting to the base station an acknowledgement to receiving the resource allocation.

According to an example embodiment, an apparatus may include a wireless transceiver and a controller coupled to the transceiver. The wireless transceiver may be configured to receive, from a base station, traffic at the mobile station during a current listening window. The controller may be configured to determine an extension (m) of the current listening window; and determine a starting location of the next listening window based on the starting point (n) of the current listening window, a length (v) of an unextended listening window, the extension (m) of the current listening window and the initial sleep window size (t).

In an example embodiment, the listening window extension (m) may be greater than or equal to the initial sleep window size (t).

Figure 12:
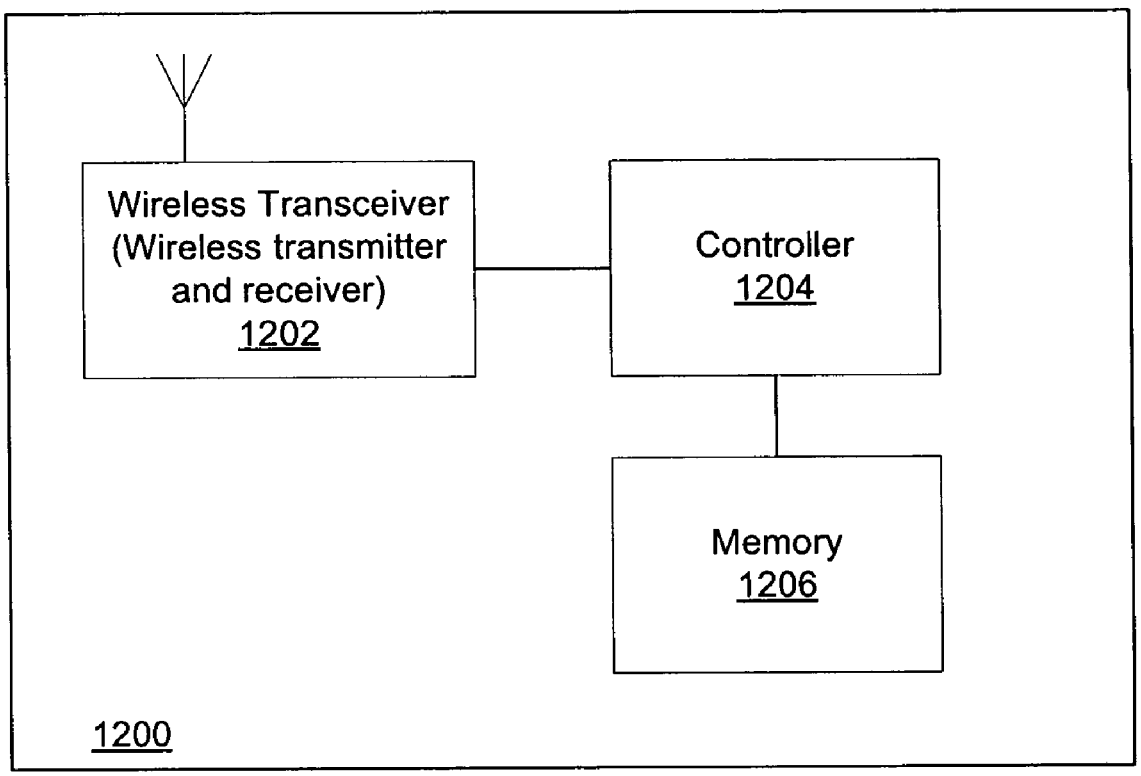
FIG. 12 is a block diagram of a wireless node according to an example embodiment.

FIG. 12 is a block diagram of a wireless station (or wireless node) 1200 according to an example embodiment. The wireless station 1200 (e.g. base station 104 or mobile node 106, 108, 110) may include, for example, a wireless transceiver (or wireless interface) 1202, including a transmitter to transmit signals and a receiver to receive signals, a controller 1204 to control operation of the station and execute instructions or software, and a memory 1206 to store data and/or instructions. Controller 1204 may also make decisions or determinations, generate frames or messages for transmission, decode received frames or messages for further processing, and other tasks or functions described herein.

Controller 1204 may be programmable and capable of executing software or other instructions stored in memory or on other computer media to perform the various tasks and functions described above, such as one or more of the tasks or methods described above.

In addition, a storage medium may be provided that includes stored instructions, which when executed by a controller or processor may result in the controller 1204, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program (s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    transmitting a scheduling information to a mobile station in a wireless network during a listening window;
    determining whether an acknowledgement has been received within the listening window from the mobile station that acknowledges receipt of the scheduling information;
    resetting a size of a next sleep window for the mobile station to an initial sleep window size if the acknowledgement has been received from the mobile station; and
    increasing a size of the next sleep window for the mobile station if the acknowledgement has not been received from the mobile station within the listening window.

2. The method of claim 1 wherein the scheduling information comprises a scheduling assignment, a Map message or other resource allocation to assign or allocate resources to the mobile station for either uplink or downlink transmission.

3. The method of claim 1 wherein the transmitting comprises transmitting a scheduling assignment via a unicast service control channel to assign or allocate resources to the mobile station for either uplink or downlink data transmission.

4. The method of claim 1 wherein the transmitting comprises transmitting a scheduling information to a mobile station in a wireless network, the scheduling information including a scheduling information to allocate or schedule a downlink transmission to the mobile station and to allocate uplink resources for the mobile station to transmit the acknowledgement that acknowledges receipt of the scheduling information.

5. The method of claim 1 wherein the transmitting comprises transmitting a scheduling information to a mobile station in a wireless network, the scheduling information including a first scheduling information to allocate resources for a downlink transmission to the mobile station.

6. The method of claim 1 wherein the transmitting comprises:
    transmitting a scheduling information to a mobile station in a wireless network, the scheduling information including a scheduling information to allocate resources for a mobile station; and
    repeating, one or more times, the transmitting of the scheduling information if an acknowledgement is not received from the mobile station within a timeout period, until either the end of the listening window is reached or an acknowledgement from the mobile station is received.

7. The method of claim 1 wherein the increasing comprises doubling a size of the next sleep window for the mobile station if the acknowledgement has not been received from the mobile station within the listening window.

8. An apparatus comprising:
    a wireless transceiver;
    a controller coupled to the transceiver;
    the wireless transceiver configured to transmit a scheduling information to a mobile station in a wireless network during a listening window;
    the controller configured to:
    determine whether an acknowledgement has been received within the listening window from the mobile station that acknowledges receipt of the scheduling information;
    reset a size of a next sleep window for the mobile station to an initial sleep window size if the acknowledgement has been received from the mobile station; and increase a size of the next sleep window for the mobile station if the acknowledgement has not been received from the mobile station within the listening window.

9. An apparatus comprising:

a wireless transceiver;

a controller coupled to the transceiver;

the wireless transceiver configured to transmit a scheduling information to a mobile station in a wireless network during a listening window;

the controller configured to:

determine that an acknowledgement has been received within the listening window from the mobile station that acknowledges receipt of the scheduling information; and reset a size of a next sleep window for the mobile station to an initial sleep window size based on the receipt of the acknowledgement.

10. A method comprising:

receiving, at a mobile station from a base station in a wireless network during a listening window, a scheduling information that assigns or allocates resources to the mobile station for either uplink or downlink transmission;

transmitting, within the listening window, an acknowledgement from the mobile station that acknowledges receipt of the scheduling information; and resetting a size of a next sleep window for the mobile station to an initial sleep window size based on the receipt of the scheduling information for the mobile station.

* * * * *